United States Patent [19]

Gaudin

[11] Patent Number: 4,868,649
[45] Date of Patent: Sep. 19, 1989

[54] APPARATUS FOR THE TELEVISUAL MONITORING OF AN ARC WELDING OPERATION

[75] Inventor: Jean P. Gaudin, Chassieu, France

[73] Assignee: Framatome, Courbevoie, France

[21] Appl. No.: 200,869

[22] Filed: Jun. 1, 1988

[30] Foreign Application Priority Data

Jun. 1, 1987 [FR] France .................. 87 07633

[51] Int. Cl.⁴ .................................. H04N 7/18
[52] U.S. Cl. ....................... 358/101; 358/93; 219/121.23; 219/121.83
[58] Field of Search .................. 358/93, 101; 219/121.23, 121.83, 103.01; 350/353, 356, 357

[56] References Cited

U.S. PATENT DOCUMENTS

| | | | |
|---|---|---|---|
| 4,168,512 | 9/1979 | Ito et al. | 358/93 |
| 4,450,339 | 5/1984 | Corby, Jr. | 319/103.1 |
| 4,488,032 | 12/1984 | Case, Jr. et al. | 358/101 |
| 4,649,426 | 3/1987 | Bolstad | 358/101 |
| 4,652,916 | 3/1987 | Suzakl et al. | 349/93 |

FOREIGN PATENT DOCUMENTS 2293188 2/1976 France .
2351550 9/1977 France .
61-78571 4/1986 Japan .

OTHER PUBLICATIONS

"Development of a CCTV System for Welder Training and Monitoring of Space Shuttle Main Engine Welds"; Gordon et al.; "Welding Journal", vol. 66, No. 3; Mar. 1987; pp. 47–54.

Primary Examiner—John K. Peng
Attorney, Agent, or Firm—Pollock, Vande Sande & Priddy

[57] ABSTRACT

The televisual monitoring apparatus incorporates at least one camera (10) fastened to the support of the welding machine. The camera (10) incorporates, interposed on the path of the light rays coming from the welding zone and upstream of a device (22) for conversion of the light rays into video signals, a filter (24) composed of a plate of ceramic material having light rotatory properties and electrodes disposed in contact with each of the two faces of the plate in accordance with a determined network. The monitoring device also incorporates, associated with the camera 10, an electronic video signal analysis and electrode potential control arrangement.

3 Claims, 5 Drawing Sheets

APPARATUS FOR THE TELEVISUAL MONITORING OF AN ARC WELDING OPERATION

FIELD OF THE INVENTION

The invention relates to an apparatus for the televisual monitoring of a zone in which an arc welding operation is carried out on metal parts by the continuous deposition of a weld bead.

BACKGROUND OF THE INVENTION

Arc welding plants are known which are designed for the automatic or semi-automatic welding of metal parts by the continuous deposition of weld beads in a bevel groove formed at the junction of the two parts.

In certain cases, the welding operation must be controlled and monitored from a distance in order to avoid the presence of an operator in the zone where the parts to be joined are situated.

This is in particular the case in the welding of parts of large dimensions in the primary circuit of a pressurized water nuclear reactor.

With a view to lengthening the life of a nuclear power station, it has recently been proposed to use new steam generators to replace used steam generators in a pressurized water nuclear reactor in which the bank of tubes has become defective in the course of long utilization.

For the purpose of carrying out this operation of replacing the whole of a steam generator, it is in particular necessary to join, by welding, the primary water inlet and outlet connections of the steam generator to the corresponding primary circuit pipes held ready in the reactor building. This operation can be carried out by semi-automatic welding, the operation being controlled from a control station situated at a certain distance from the welding zone. An operator must permanently monitor the welding operation with the aid of a visual display, on a television screen, of the zone in which the weld bead is formed.

In this case, it is necessary to provide a very clear image of the welding zone, because with the aid of the image on the screen the operator must evaluate any action that must be taken to achieve the deposition of a perfect weld bead. It is in fact necessary to obtain a deposit of weld metal which is free from defects.

The arc welding plants used for welding pipes of large dimensions are of the orbital type and incorporate a motorized support member mounted for movement on a circular rail fixed on one of the pipes being joined. On this support member is mounted a TIG welding head incorporating an electrode permitting the refusion of filler wire continuously fed to the zone of the arc struck between the electrode and the junction zone of the parts. The welding head is mounted for oscillation in the transverse direction in relation to the orbital movement of the welding machine. A sweep is thus made over the width of the weld bead.

Televisual observation of the welding zone is therefore complicated by the existence of a very bright spot or zone, corresponding to the arc moving over the width of the weld bead, at the center of the welding zone. The weld bead on which the operator must concentrate his attention may be poorly visible because of the very high luminous intensity of the arc. It is possible to use an opaque filter, but the parts of the welding zone which are not directly subjected to the light of the arc will then be poorly visible, even if floodlights are used to illuminate the welding zone. To achieve effective monitoring of the welding in progress, the operator must be provided with an image of the entire bevel groove which is sufficiently clear, in particular, for verification of the state of the bead just deposited and its position in relation to the other beads deposited previously, and also for monitoring the progress of the welding.

SUMMARY OF THE INVENTION

The invention therefore is intended to provide an apparatus for the televisual monitoring of a zone in which an arc welding operation is being carried out on metal parts by the continuous deposition of a weld bead, using a welding machine incorporating a moveable support and a welding head mounted for oscillation on the support in order to make a transverse sweep during the deposition of the weld bead, this monitoring apparatus incorporating at least one video camera fastened to the support of the welding machine, and enabling the operator to be provided with an extremely clear image of the entire welding zone.

To this end, the video camera incorporates, interposed on the path of the light rays coming from the welding zone and upstream of a device for converting these light rays into video signals, a filter composed of a plate of ceramic material having light rotatatory properties and electrodes disposed in contact with one or the other of the two faces of the plate in accordance with a determined network, and the monitoring apparatus also incorporates, associated with the camera, an electronic unit analyzing the video signal and controlling the potentials of the electrodes, in order to regulate the electric fields passing through the ceramic plate in the direction of its thickness to values making it possible to obtain a desired density of the filter in different zones defined by the electrode network.

BRIEF DESCRIPTION OF THE DRAWINGS

In order to enable the invention to be well understood a description will now be given, by way of example and with reference to the accompanying drawings, of an embodiment of a monitoring apparatus according to the invention.

DESCRIPTION OF PREFERRED EMBODIMENT

Figure 1:
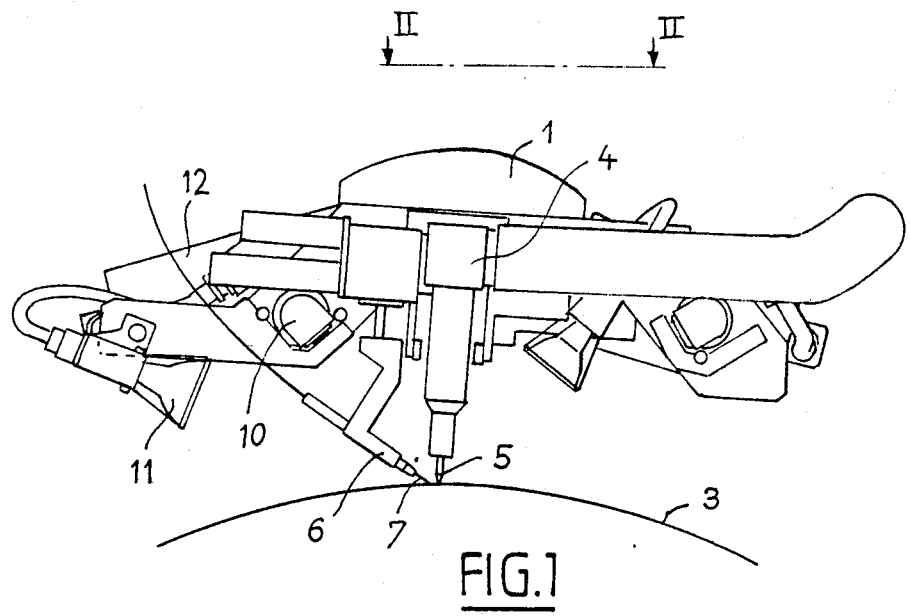
FIG. 1 is a front view in elevation of a welding machine incorporating a monitoring apparatus according to the invention.
Figure 2:
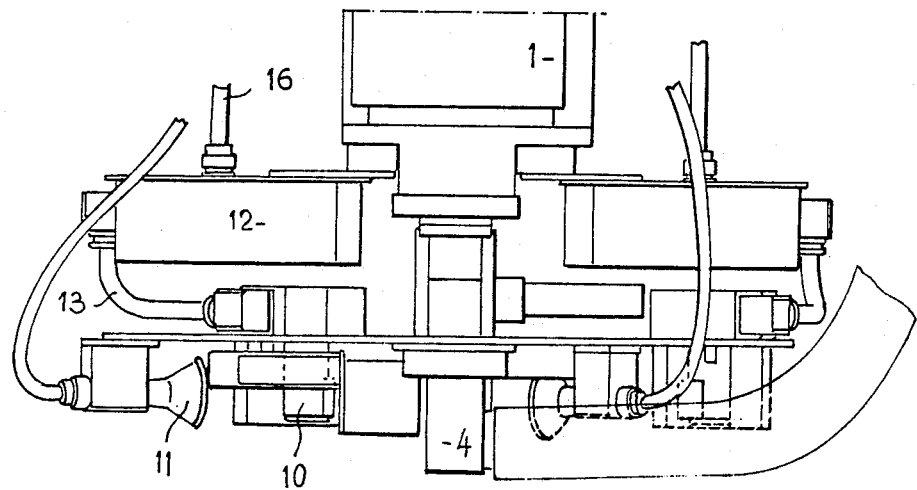
FIG. 2 is a top plan view on the line II-II in FIG. 1.

In FIG. 1 and 2 can be seen the support 1 of the welding machine, which is mounted on rails (not shown) for movement in an orbital path, in either direction of rotation, around a welding bevel provided between the end of a primary pipe and the end of a connector joining a steam generator to said primary pipe of a pressurized water nuclear reactor. FIG. 1 shows only the line 3 corresponding to the bottom of the bevel on which a weld bead is to be deposited with the aid of the welding head 4, which is provided with an electrode 5. A device 6 enables a welding wire 7 to be brought continuously into the arc which is struck between the electrode 5 and the bottom 3 of the bevel when the electrode is supplied with electric current.

The apparatus for the televisual monitoring of the welding zone comprises two identical units situated one on each side of the welding head 4 and fixed on the support 1. Each of the units comprises a video camera 10, a floodlight 11, an electronic unit casing 12, and a set of supply or connection cables for the different components of the monitoring apparatus. The monitoring apparatus therefore makes it possible to obtain two images of the bevel, taken respectively from the front and from the back of the welding machine referring to its direction and the sense of its movement.

Figure 3:
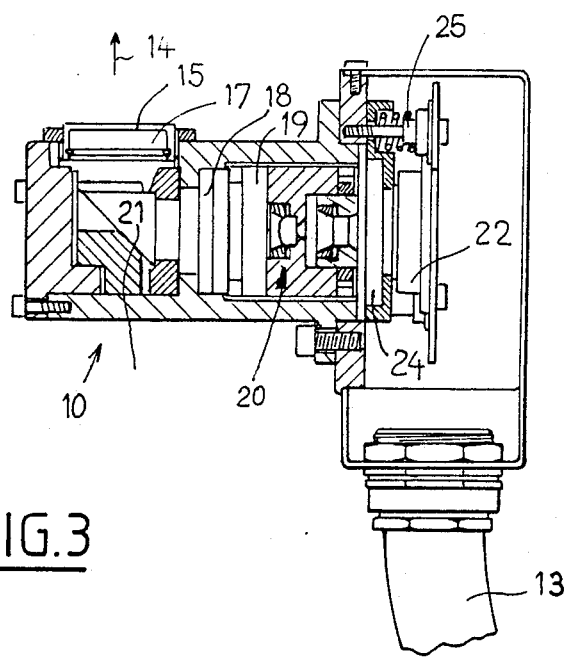
FIG. 3 is a view in section of one of the video cameras of the monitoring apparatus.

FIG. 3 shows a video camera 10 which has an inlet window 15 directed towards the bottom of the bevel 3 (direction of the arrow 14) when the camera is mounted in the operating position on the welding machine. At its other end, the camera has an outlet for a video cable 13 enabling the video signal to be transmitted to the electronic unit casing 12, which in turn is connected to the control station of the welding plant by a video cable 16. Between the inlet window 15 and the video signal outlet 13, the camera contains in conventional manner a set of filters 17, 18, 19, a light beam return prism 21, an objective 20, and a miniaturized electrooptical circuit 22 in the form of an electronic chip. The video signal obtained at the output of the circuit 22 is transmitted by the cables 13 and 16 to the control station for the reconstruction of the image on the television screen.

According to the invention, an additional filter 24 is interposed between the objective 20 and the circuit supplying the video signal 22. The filter 24 is held in position on the camera by an assembly 25 comprising a bow, screws and support springs.

Figure 4:
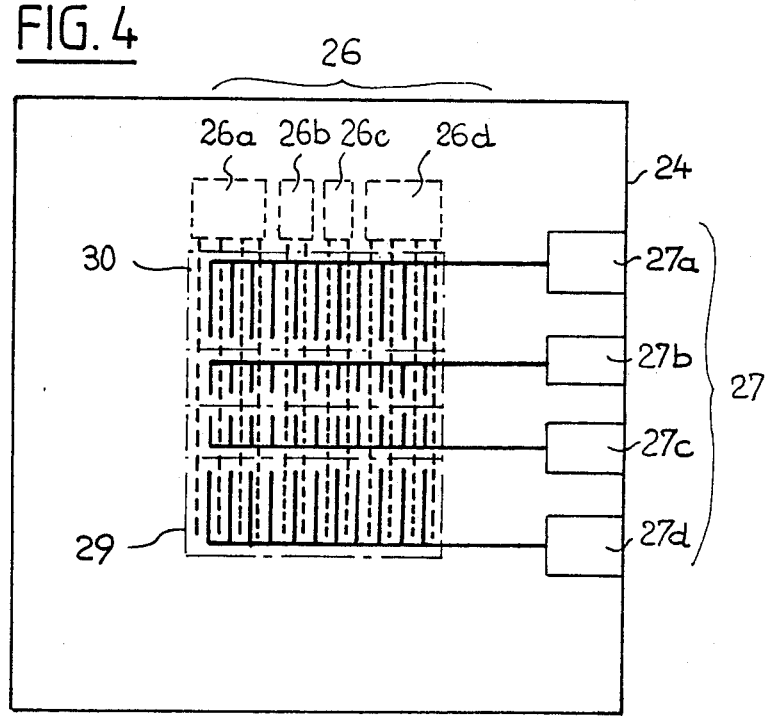
FIG. 4 is a plan view of a filter associated with the video camera shown in FIG. 3.
Figure 5:
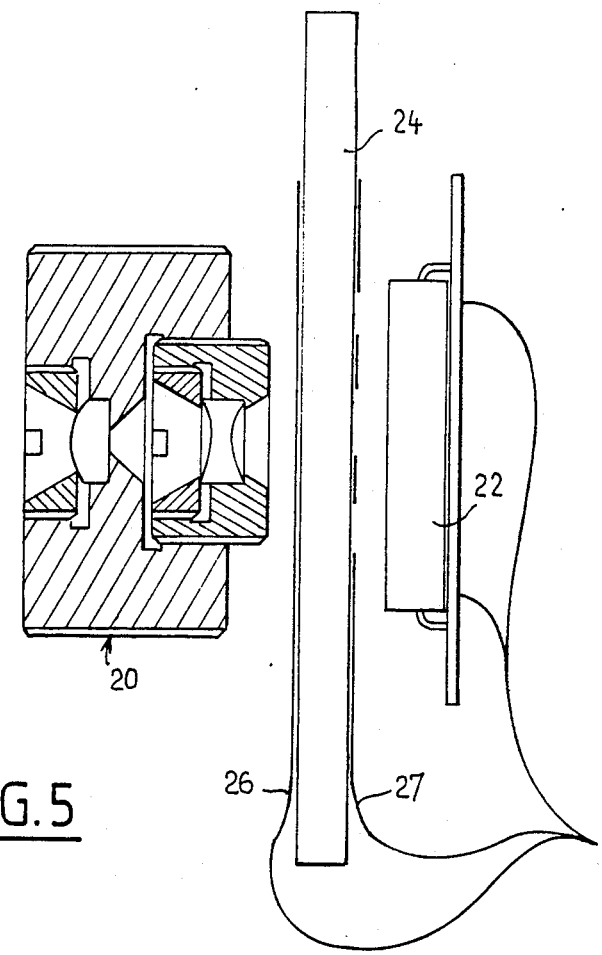
FIG. 5 is a view in section and elevation on a larger scale of a part of the camera shown in FIG. 3.

FIGS. 4 and 5 show the filter 24, which is composed of a plate of ceramic material having light rotatory properties sensitive to the action of an electric field in the material of the ceramic plate 24. The square plate 24 has sides of a length of 25.4 millimeters and a thickness of 0.3 millimeter.

Four rectilinear electrodes 26a, 26b, 26c and 26d are brought into contact with one of the faces of the ceramic plate 24 directed towards the objective 20, in the central part of said plate.

Four other electrodes 27a, 27b, 27c and 27d are brought into contact with the other face of the ceramic plate 24, directed towards the electronic circuit 22, in the central part of said plate. The electrodes 27a, 27b, 27c and 27d are at right angles to the electrodes 26a, 26b, 26c, 26d and have branches parallel to the latter.

The electrodes are formed by deposition of a layer of chromium of a thickness less than 50 μm and width of 60 μm on the faces of the plate 24. The ends of the electrodes intended to be joined to the control circuit by conductors are covered with gold.

In FIG. 4, dotted lines indicate a square 29 situated at the center of this zone covered by the electrodes, the sides of this square measuring less than 10 millimeters. Square 29 corresponds to the inlet window of the optoelectronic circuit 22. This active zone of the filter, traversed by the light rays leaving the objective and originating from the welding zone, is divided into sixteen substantially square zones 30, each corresponding to the intercrossing of two electrodes situated one on each side of the plate 24 constituting the filter.

When the electrodes 26 and 27 are fed at different potentials, electric fields pass through the plate 24 in the direction of its thickness. Electric fields can be regulated to desirable values, in each of the elementary zones 30, by adjusting the potentials of the corresponding electrodes 26 and 27.

These electrode potentials are adjusted by means of the electronic unit disposed inside the casing 12, which is connected to the camera by a connection cable 13. The control of the electrodes is the result of the analysis of the video signal passing out of the circuit 22, and permits adjustment of the electric fields in such a manner as to increase the optical density of the filter in certain zones, in order to reduce the brightness effect of the arc. The other zones 30 of the active part 29 of the filter 24 may simultaneously retain a low density and a low filtering power, the potentials of the corresponding electrodes being selected accordingly.

The ceramic material has in fact light rotatory properties dependent on the electrical field to which it is subjected, so that the control of the potential of the electrodes makes it possible to adjust the density of the filter in the different zones 30. As a general rule, the density of the filter will be adjusted to a higher value at the center of the active zone 29 than on the periphery, since the central part receives the rays originating from zones subjected directly to the light of the arc.

The electronic unit casing 12 contains an arrangement for analysis of the video signal coming from the optoelectronic circuit 22 and control of the potentials of the electrodes 26 and 27 situated one on each side of the ceramic plate 24 constituting the filter.

Figure 6:
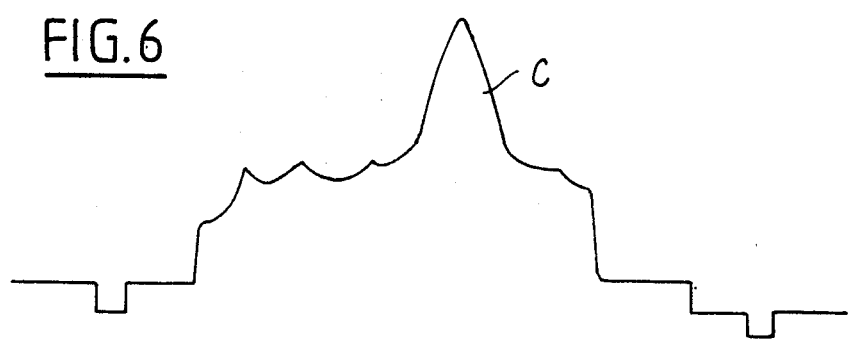
FIG. 6 is a schematic representation of the video signal of the camera along a line.

FIG. 6 shows schematically the variations of the intensity of the video signal along any line of a picture frame. This line has a crest C corresponding to a luminous intensity maximum.

Figure 8:
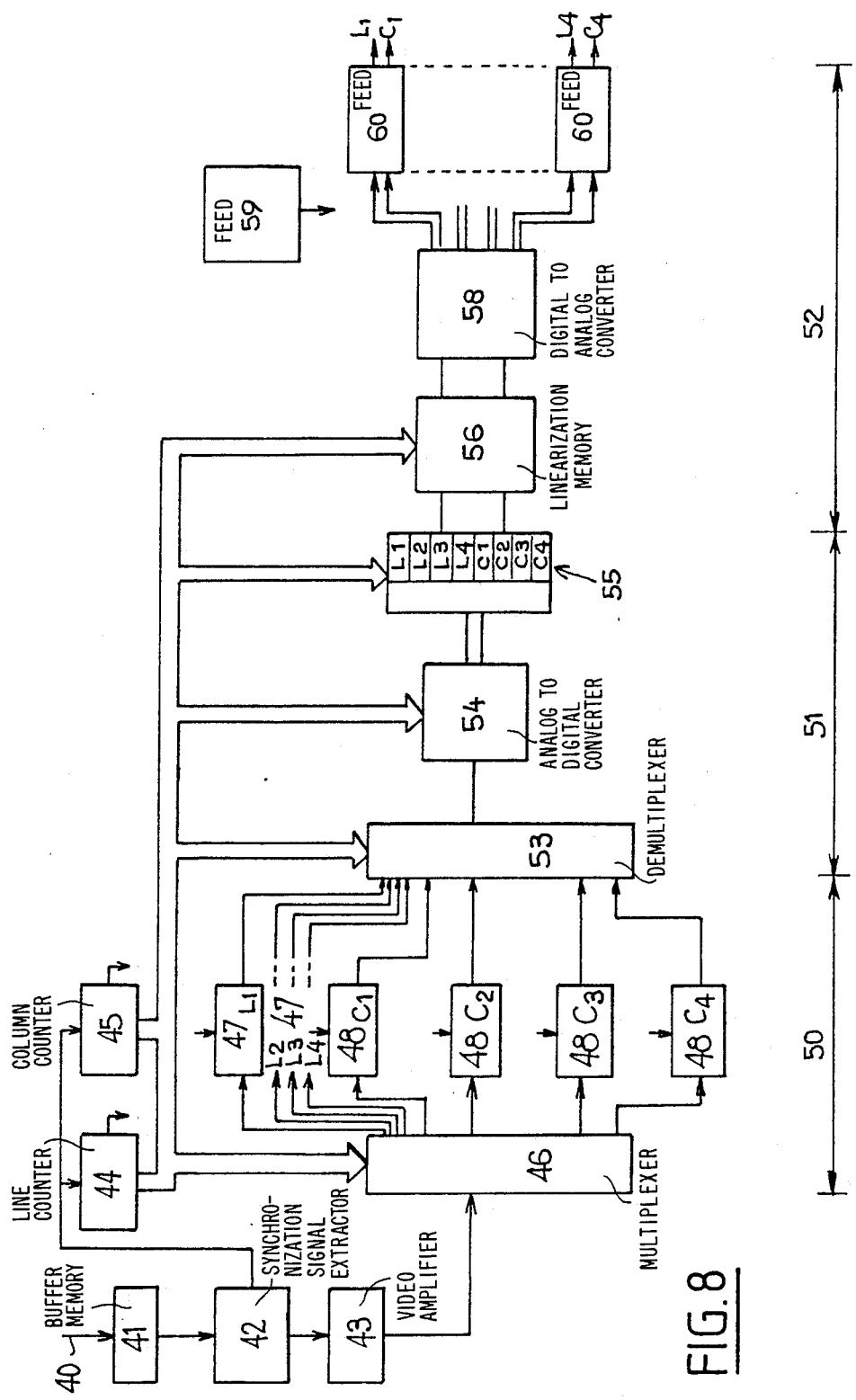
FIG. 8 is a simplified electronic diagram of the analysis and filter control device.

The electronic arrangement shown in FIG. 8 detects the maxima C by analyzing the video signal line by line for a complete picture frame. At the end of this analysis the values acquired are applied in the form of high potentials to the filter 24 on the analysis of the next frame.

Figure 7:
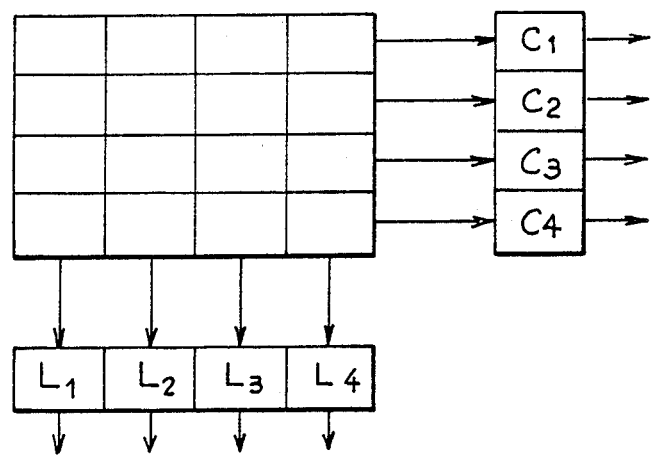
FIG. 7 is a schematic representation of the analysis and filter control device of the camera.

A picture frame is broken down into four horizontal bands and four vertical bands, as can be seen in FIG. 7. The horizontal bands are obtained by dividing the frame into four sets $Li_{(1,4)}$ comprising seventy-eight successive lines, and the vertical bands by time division into four columns $C_{(1,4)}$ of 16 μs each. The intersection of the horizontal and vertical bands gives sixteen active zones in the filter 24, for which zones it is appropriate to apply two high potentials dependent on the values $Li_{(1,4)}-C_{(1,4)}$ by means of the electrodes 26 and 27.

Taking into account the video scanning process, the detection of maxima is achieved by fast logic processing, with multiplexing, multiplexing head detection, analog to digital conversion, and storage of maxima. These values of maxima are utilized during the next frame.

The logic processing is effected synchronously on the basic of the timing diagram of the composite video signal. The line and frame synchronization signals are extracted from the composite video signal 40 received in a buffer memory 41. These signals are taken into account by different counters which attend to the management of all the circuits necessary for the processing.

The line synchronization signals increment a line sync pulse summation counter, followed by a divider dividing by 78 and incrementing a line counter Li from 1 to 4. On each incrementation the counter Li generates the addressing of the multiplexer-demultiplexer and of the registers L1-L2-L3-L4. The value contained in the crest detector Li is transmitted to the corresponding register L1-L2-L3-L4 after digital conversion, and the crest detector Li and the line sync pulse summation counter are zeroized. The line counter Li is zeroized by the end of frame signal and is therefore once again in the starting configuration for the following frame.

In respect of the columns the line sync pulses validate, for each line, four monostables of 16 $\mu$s periods connected in cascade and incrementing a column counter C from 1 to 4, this counter being zeroized at the end of each line.

For an incrementation the column counter $C_{(1,4)}$ generates the different addressings necessary for the various processing circuits. The crest detectors $C_{(1,4)}$ are validated cyclically once per line during 16 $\mu$s at the rate of x lines per frame by the column counter C. At the end of the frame the four values of maxima present in the crest detectors $C_{(1,4)}$ are transmitted sequentially to the four registers $C_1$, $C_2$, $C_3$, $C_4$ after digital conversion.

At the end of this processing phase the four values of maxima of lines and columns are available in digital form in the eight registers.

In the following frame this logic processing is repeated in accordance with the same principle. During this processing the line and column counters attend to the management of the linearization memory which acquires the values present in the registers in proportion as the latter are renewed. Linearization is effected in order to obtain linear response of the filter to the values of the maxima.

When linearization has been effected, the values of the maxima are converted back into analog values before being applied to variable control double feeds for the purpose of being amplified in order to obtain the electrode control potentials necessary for the operation of the ceramic plate.

FIG. 8 shows schematically the components of the electronic arrangement enabling the processing described above to be carried out.

The components constituting the first stage 50 of the arrangement comprise a buffer memory, a synchronization signal extractor 42, a video amplifier 43, a line counter 44, a column counter 45, a multiplexer 46, a crest detector 47 on the lines $L_1$ to $L_4$, and a set of crest detectors 48 in the columns $C_1$ to $C_4$.

The second stage 51 of the electronic arrangement comprises a demultiplexer 53, an analog to digital converter 54, and a set of line and column registers 55.

Finally, the third stage 52 of the electronic arrangement comprises a linearization memory 56, an digital to analog converter 58, and the feeds 59 and 60 for the electrodes 26 and 27.

The optical density of the different parts of the filter is therefore at every moment dependent on the electrical fields passing through the ceramic plate, and therefore on the analysis of the video picture. This results in continuous and practically instantaneous adaptation of the filter to the luminosity conditions in the welding zone.

The potentials of the electrodes situated on each side of the filter are of opposite signs and their amplitude depends on the amplitude of the maxima detected on the video signal, per line and per column, in accordance with segmentation corresponding to the segmentation of the electrodes of the filter as illustrated in FIG. 7.

The apparatus according to the invention therefore makes it possible to obtain continuously a clear image of the welding zone whatever the position and intensity of the arc.

The conditions under which the welding operation can be telemonitored are therefore improved, and the operator thus has at his disposal improved means for monitoring and controlling the welding operation.

It is possible to use a larger number of vertical and horizontal electrodes situated on each of the filter.

Nevertheless, it should be observed that the zone of action of each of the electrodes extends to the interior of the ceramic material, beyond the limits of square zones strictly defined by the electrodes. This results in considerable interaction and the existence of nunmerous zones of complex shapes, in which the filter has variable densities. The precision of the action of the filter is therefore very good without a large number of electrodes being used, and therefore without a very complex control device being necessary.

The electronic video signal analysis and electrode control system may be of a different form and structure from those described above.

I claim:

1. Apparatus for the televisual monitoring of a zone in which an arc welding operation is carried out on metal parts by the continuous deposition of a weld bead, using a welding machine incorporating a movable support (1) and a welding head (4) mounted for oscillation on the support (1) in order to make a transverse sweep during the deposition of the weld bead, this monitoring apparatus incorporating at least one video camera (10) fastened to the support (1) of the welding machine, the video camera (10) incorporating interposed on the path of the light rays coming from the welding zone and upstream of a device (22) for converting these light rays into video signals, a filter composed of a plate (24) and electrodes (26, 27) disposed in contact with one or the other of the two faces of the plate (24) in accordance with a determined network, and the monitoring apparatus also incorporating, associated with the camera, an electronic unit (12) connected through a video cable to a control station for the reconstruction of the image on a television screen, and analyzing the video signal and controlling the potentials of the electrodes (26, 27) in order to regulate the electric fields passing through the plate (24) in the direction of its thickness to values making it possible to obtain a desired density of the filter in different zones defined by the network of electrodes (26, 27), wherein the plate (24) is made of a ceramic material having light rotatory properties, and the electrodes (26, 27) are composed of rectilinear conductive bands in contact with each of the faces of the plate (24) of ceramic material, defining zones (30) on the plate (24) which are disposed in succession in lines ($L_1$, $L_2$, $L_3$, $L_4$) and columns ($C_1$, $C_2$, $C_3$, $C_4$) so as to form a square-meshed network.

2. Monitoring apparatus according to claim 1, wherein the electronic unit (12) incorporates means (47) for determining the maximum of the video signal on each of the successive lines, means (48) for determining the maximum of the video signal on each of the successive columns, and means (54, 55, 56, 58) for processing the maxima detected in the course of the analysis of the video signal in order to supply a control voltage to each of the electrodes (26, 27) which are placed in a horizontal or vertical direction.

3. Monitoring apparatus according to claim 1, wherein the filter is interposed between an objective (20) and the device for converting the light rays into a video signal situated at the outlet of the video camera (10).

* * * * *